W. G. Wright,
Well Tubing.
No. 56,137. Patented July 3, 1866.

Witnesses:

Inventor;
W. G. Wright

UNITED STATES PATENT OFFICE.

W. G. WRIGHT, OF HORNELLSVILLE, NEW YORK.

IMPROVEMENT IN TUBULAR WELLS.

Specification forming part of Letters Patent No. 56,137, dated July 3, 1866.

*To all whom it may concern:*

Be it known that I, W. G. WRIGHT, of Hornellsville, in the county of Steuben and State of New York, have invented a new and useful Improvement in Tubular Wells; and I do hereby declare that the following is a full, clear, and exact description of the same, reference being had to the annexed drawings, forming a part of this specification, in which—

Figure 1:
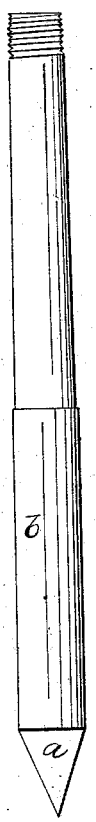
Figure 2:

Figure 1 is a view of the well-tube as it is while being driven into the ground; and Fig. 2 is a sectional view of the well after it has been driven to the required depth and the sliding tube, with the inclosed filtering apparatus, has been extended to admit the water.

To enable others skilled in the art to which it appertains to make and use my invention, I will proceed to describe its construction and uses.

The drawings represent a well-tube which is supposed to be driven into the ground, *a* representing the point, *b* the main tube, in which is another tube, arranged to slide out of the tube *b* when a proper depth is reached. This sliding tube *c* has in it a series of apertures through which to admit the water; but as any apertures in metal would necessarily be large enough to admit sand and dirt also, a conical tube of wire-netting, *d*, is fixed in the tube *c* with its point downward, and the space between them is filled with hemp, curled hair, or any fibrous substance suitable to act as a filter to keep all sand and dirt from the interior of the tube.

During the process of driving into the ground the tube *c* and the inclosed cone *d* are protected from injury, being entirely inclosed in the main tube *b*, the end of which rests upon a shoulder of the point, as shown in Fig. 1.

The cone *d* is not intended to act as a filter or strainer, as neither is the tube *c*, but is used to keep in place the filtering material which is between it and the tube *c*.

When a proper depth is reached the tube *c* is extended and the water admitted through the apertures and filtered through the fibrous substance into the interior, and drawn from the top by a pump not shown in the drawings, but affixed to the main tube after a proper depth is reached.

This filtering apparatus is of benefit, and is adapted to many other uses and applications besides that of driven wells, though that is the form shown in the accompanying drawings.

In many localities where clay is not encountered the use of the sliding tube *c* may be dispensed with, the water being admitted through apertures in the main tube.

The improvement consists in fixing a conical tube of wire-netting, *d*, in the sliding tube *c*, or in the main tube *b*, and stuffing the space between them with hemp, curled hair, or any suitable fibrous material that shall filter the water and free it from sand and all other extraneous substances which would otherwise enter the tube and be drawn up by the pump.

Having thus described and defined my invention, what I claim as new, and desire to secure by Letters Patent, is—

The use of hemp or any suitable fibrous filtering material, as described.

W. G. WRIGHT.

Witnesses:
A. T. CAMPBELL,
A. S. FRAZEE.